Oct. 21, 1958     J. BOUVAT-MARTIN     2,857,215
TOP-LUBRICATED AXLE-SPINDLE BEARINGS
Filed June 1, 1955       2 Sheets-Sheet 1

Oct. 21, 1958 J. BOUVAT-MARTIN 2,857,215
TOP-LUBRICATED AXLE-SPINDLE BEARINGS
Filed June 1, 1955 2 Sheets-Sheet 2

United States Patent Office
2,857,215
Patented Oct. 21, 1958

2,857,215

TOP-LUBRICATED AXLE-SPINDLE BEARINGS

Jean Bouvat-Martin, Paris, France, assignor to Société Anonyme dite: Société Generale Isothermos, Paris, France Application June 1, 1955, Serial No. 512,441

Claims priority, application France June 9, 1954

3 Claims. (Cl. 308—79)

The present invention is concerned with improvements in the design of the channels whereby the lubricating oil is directed from the supply sump generally provided on the upper face of bearings of the so-called top-lubrication type to the lubricant-distributing grooves provided on the axle-spindle proper.

It is already known in apparatus of this type that due to the oil flow occurring through the "low" points this oil has a marked tendency, in top-lubricated axle-spindle bearings, to flow down the lateral inner skirt of the bearing, i. e. out of reach of the axle spindle.

Many devices have already been proposed for constraining the oil to flow or drip onto the axle spindle; thus, notably, many attempts have been made with a view to create "low" draining points in the leading angle, i. e. the angle joining the circular face of the axle spindle with the curved surface of the inner lining of the bearing.

A known arrangement consists in forming in the wall of the bearing proper a plurality of divergent channels, i. e. ducts disposed fanwise, having formed on their faces registering with the bearing axis a number of ribs constituting as many points from which the oil may drip onto the spindle to lubricate same.

However, these cavities in the bearing body reduce the mechanical strength of the bearing and when a certain amount of wear has occurred the bearing surface proper registering with these ducts is considerably flattened.

It has also been proposed to avoid this reduction in the mechanical strength of this type of bearing by arranging the oil-delivering ducts in several sections disposed obliquely and symmetrically relative to a vertical transverse plane of the bearing, these ducts being of progressively increasing cross-sectional area towards the oil grooves formed in the inner bore of the bearing.

It is the essential object of this invention to provide an improved construction and design of these oil-supply ducts from the upper sump to the oil-distributing sump or grooves of the bearing.

According to this invention these ducts lead into the upper surface of the bearing in close proximity of the oil-distributing channel through a diamond- or rhombus-shaped orifice of which one side merges into the oil distributing edge or bead provided in the aforesaid channel.

The sides of the rhombus constituting the cross-sectional shape of the aforesaid orifice may be straight or curvilinear, and this diamond-shaped orifice is characterized in that the top side adjacent to the oil-delivering edge or bead of the channel is level with or below the channel, whilst the adjacent top disposed adjacent to the lateral edge of the bearing and to the side thereof is located at the same level or slightly above; the other adjacent top of the diamond-shaped orifice is positioned at a lower level and constitutes the lowermost point of the orifice relative to the channel, the fourth top being at an intermediate level.

In other words, the orifice of the supply channel is obtained by cutting the upper face of the bearing through an oblique plane such that the major slope of the orifice is projected on the diagonal of the rhombus the uppermost point of which is the outer top on the side of the bearing flank whilst the lowermost point is the opposite top on the oil-draining face.

The cross-sectional shape of this supply duct is preferably of progressively increasing width in the direction of the oil-distributing sump or groove formed in the bearing bore.

The dimensions and shape of this orifice vary according to its arrangement and its edges are sharp or rounded according to machining requirements.

Preferably, these ducts are disposed obliquely and symmetrically relative to a vertical transverse plane of the bearing.

The duct face adjacent to the oil-distributing channel, which is generally positioned in the vertical plane of the edge or bead of this channel over which the oil is adapted to flow, is the oil-distributing face and may be provided with ribs adapted to properly distribute the oil flow in the oil-supply sump or groove formed in the bearing bore.

In order to afford a clearer understanding of the invention and of the manner in which the same may be carried out in the practice, a preferred form of embodiment will be described hereafter with reference to the accompanying drawing, wherein.

Figure 1:
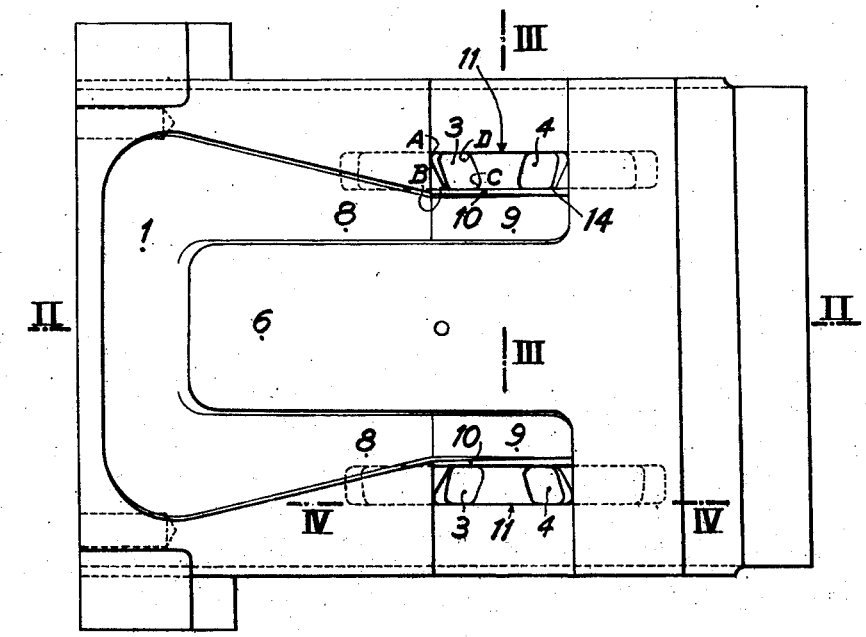
Figure 1 is a plan view from above of the bearing.
Figure 2:
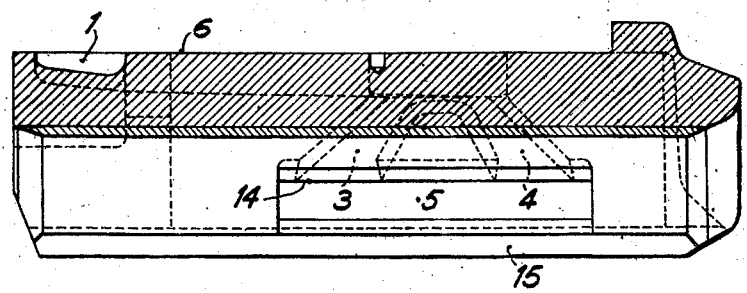
Figure 2 is a vertical section taken upon the line II—II of Fig. 1.
Figure 3:
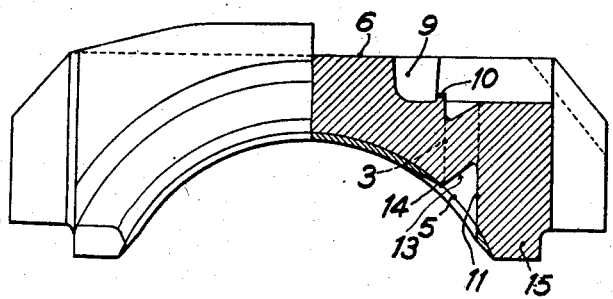
Figure 3 is an end view with vertical fragmentary section taken upon the line III—III of Fig. 1.
Figure 4:
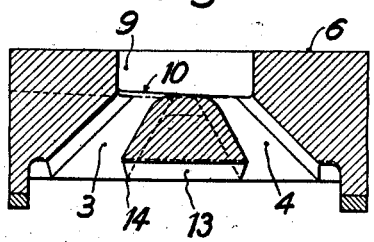
Figure 4 is a fragmentary section taken upon the line IV—IV of Fig. 1.

The bearing illustrated in this example is a top-lubricated metal bearing having a generally rectangular cross-sectional shape and a semi-circular inner bore of a span of about 120°.

The oil is fed from known means into the supply sump 1 formed in the upper horizontal face 6 of the bearing; this sump is provided with a pair of lateral extensions 8 disposed symmetrically with respect to the longitudinal axis of the bearing and leading into a pair of rectangular channels 9 having an oil-discharge bead 10 formed on their outer sides.

To simplify the disclosure only one side of the symmetrical bearing will be described.

A plurality of ducts designed to lead the oil to the bearing bore are provided adjacent to this discharge bead 10.

Two ducts 3, 4 are provided in the example illustrated; they are divergent or extend fanwise and symmetrically with respect to a vertical plane disposed transversely to the bearing axis.

Each duct 3, 4 is of progressively increasing width towards the oil-collecting sump 5 and in this example this sump 5 has the shape of a longitudinal groove having a wall 13 substantially coincident with a radial plane of the bearing and an opposite substantially vertical outer wall 11 on the side of the lateral skirt 15 of the bearing.

Figure 5:
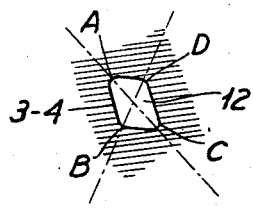
Figure 5 is a detail section showing the shape of the oil-supply duct.
Figure 6:
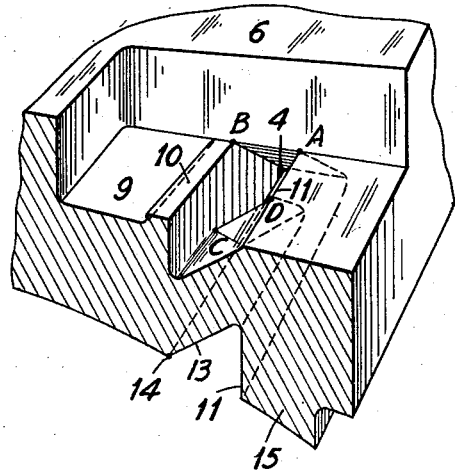
Figure 6 is a perspective view of a portion of the bearing on a greatly enlarged scale as seen at the right-hand side of Figure 3.

The essential feature of this invention lies in the fact that these ducts 3 and 4 begin at a location very close or adjacent to the channel 9; as shown in Fig. 5 each duct consists of an orifice 12 or diamond- or rhombus shape with rounded angles, the rhombus being curvilinear, if desired.

One side BC of this rhombus lies in the vertical plane of the bead 10 over which the oil is caused to flow; the parallel AD of this orifice lies in the plane containing the face 11 of the lubricating sump.

If the oil flowing down the channels 8, 9 and then through the ducts 3, 4 is to follow the vertical wall adjacent the dripping bead 10 the so-called low points must be formed on this bead.

To this end, assuming that point B is level with the bead 10, the top A of the rhombus will be located at a slightly higher level, or the point B will be slightly lower than the bead 10 and in this last case the top A may be level with the bead 10.

The point C is constantly located at a lower level than points A and B and constitutes the lowermost point of the orifice.

Point D will be located at an intermediate level.

To sum up, the line of major slope of this rhombus-shaped orifice 12 is projected in plane view along the diagonal of this rhombus, so that the lowermost point is the inner point C and the uppermost point the outer point A.

It has been observed under these conditions that any oil supplied to the sump 1, even in large quantities, will flow abundantly over the bead 10 until the orifices 3, 4 are completely filled, then this oil will follow the line of major slope, i. e. towards the point C, and finally this oil will flow along the oblique face of each duct on the side thereof which is nearest to the longitudinal axis of the bearing, until the oil drains from the edge 14 into the sump 5.

Of course, the inclination of these ducts 3, 4 with respect to the vertical, as well as their dimensions and progressively increasing cross-sections in the direction of the collecting or lubricating sump or groove proper, may be modified according to the specific use for which the bearing is intended.

Besides, ribs may be provided on the oil-receiving faces of these ducts, i. e. along the bead 10 and down the edge 14.

Again, the number of orifices may be varied according to the longitudinal dimensions of the bearing.

In bearings constructed in accordance with the teachings of this invention a very uniform oil distribution is obtained, and the oil drips onto the leading face of the spindle as in bearings having oil-supply ducts disposed fanwise, but the arrangement of this invention offers the additional advantage that since no metal is removed from the bearing between the orifices 12 the hitherto noticed deformation and premature wear of the bearing are avoided to a substantial extent.

The shape of the orifices 12 may vary from the lozenge having sharp or rounded corners to the oval, provided that a low point as defined hereinabove is maintained in close vicinity of the bead over which the oil is caused to flow from the supply sump or channel of the bearing.

What I claim is:

1. In a device for lubricating an axle spindle from above, a bearing having oil-supply sumps formed in its upper face and having an inner face formed with longitudinally-extending grooves therein, longitudinal oil-dripping edges on each side of the vertical axial plane of the bearing, oil ducts connecting said sumps to said grooves and opening into the lower face of the bearing along said oil-dripping edges each with a substantially oblique rhombus-shaped extremity, the rhombus having a vertex in the vertical plane of the oil-dripping edge and at a level lower than that of its other vertices, said vertex defining the lowermost point of the extremity with respect to the level of the associated oil-dripping edge.

2. A bearing for lubricating an axle spindle from above having an outer face formed with an oil-supply sump and longitudinal channels and having an inner face formed with parallel longitudinal grooves, longitudinal oil-dripping edges on each side of the vertical axial plane of the bearing, one wall of each groove being positioned substantially coincidently with a radial plane of said bearing with the opposite wall in a vertical plane, and oil ducts connecting said oil-supply channels with said grooves, said ducts opening into the upper surface of said bearing through extremities of substantially rhombus shape, the lowermost point of each extremity lying in a vertical plane including said oil-dripping edge.

3. A bearing for lubricating an axle spindle from above having an outer face formed with an oil-supply sump and longitudinal channels and having an inner face formed with parallel longitudinal grooves, longitudinal oil-dripping edges, oil ducts connecting said oil-supply channels with said grooves, said ducts having an inlet extremity and an outlet extremity and being disposed fanwise and symmetrically between each oil-dripping edge and its associated groove and having a cross-sectional area increasing progressively from the inlet extremity to the outlet extremity, said inlet extremity being of substantially rhombus shape and disposed in such manner that a vertex of the rhombus is positioned in the vertical plane including said oil-dripping edge and defines the lowermost point of the inlet extremity.

References Cited in the file of this patent

UNITED STATES PATENTS

| | | |
|---|---|---|
| 1,789,255 | Peyinghaus | Jan. 13, 1931 |
| 2,041,107 | Bastin | May 19, 1936 |
| 2,115,746 | Peyinghaus | May 3, 1938 |